(12) United States Patent  
Su et al.

(10) Patent No.: US 7,430,869 B2  
(45) Date of Patent: Oct. 7, 2008

(54) SYSTEM FOR CATALYTIC COMBUSTION

(75) Inventors: Shi Su, Pullenvale (AU); Andrew Charles Beath, Pullenvale (AU); Clifford William Mallett, Pullenvale (AU)

(73) Assignee: Commonwealth Scientific and Industrial Research Organisation, Campbell, Australian Capital Territory 2612 (AU)

( * ) Notice: Subject to any disclaimer, the term of this patent is extended or adjusted under 35 U.S.C. 154(b) by 0 days.

(21) Appl. No.: 10/529,515

(22) PCT Filed: Sep. 26, 2003

(86) PCT No.: PCT/AU03/01275

§ 371 (c)(1),  
(2), (4) Date: Oct. 11, 2005

(87) PCT Pub. No.: WO2004/029433

PCT Pub. Date: Apr. 8, 2004

(65) Prior Publication Data

US 2006/0150635 A1 Jul. 13, 2006

(30) Foreign Application Priority Data

Sep. 27, 2002 (AU) .............................. 2002951703

(51) Int. Cl.
- *F02C 3/04* (2006.01)
- *F02C 3/22* (2006.01)
- *F02C 7/08* (2006.01)
- *F02C 9/40* (2006.01)
- *F23R 3/40* (2006.01)

(52) U.S. Cl. .................. 60/777; 60/723; 60/39.465; 60/39.511

(58) Field of Classification Search .................. 60/777, 60/723, 39.12, 39.464, 39.465, 39.463, 39.461, 60/39.511  
See application file for complete search history.

(56) References Cited

U.S. PATENT DOCUMENTS

| 3,957,464 | A | * | 5/1976 | Teller ........................... 95/196 |
| 4,067,190 | A | | 1/1978 | Hamm et al. ............... 60/39.69 |
| 4,381,641 | A | * | 5/1983 | Madgavkar et al. ........... 60/777 |
| 4,936,088 | A | * | 6/1990 | Bell ............................ 60/777 |
| 5,059,405 | A | * | 10/1991 | Watson et al. ............... 423/210 |

(Continued)

FOREIGN PATENT DOCUMENTS

EP 1010947 A 6/2000

(Continued)

*Primary Examiner*—Ted Kim  
(74) *Attorney, Agent, or Firm*—Ladas & Parry, LLP

(57) ABSTRACT

A system comprising a compressor (10) having an inlet stream (25) and an outlet stream (26), a pre-heater (12) having a process inlet stream (29) and a process outlet stream (31), a catalytic combustor (13) having an inlet stream (32) and an outlet stream (33) and containing an catalyst, and a turbine (14) having an inlet stream (34) and an outlet stream (35), wherein, the outlet stream (26) of the compressor(10) is connected to the process inlet stream (29) of the pre-heater (12), the process outlet stream (31) of the pre-heater (12) is connected to the inlet stream (32) of the catalytic combustor (13). The outlet stream (33) of the catalytic combustor (13) is connected to the inlet stream (34) of the turbine (14). During operation of the system, the inlet stream (25) of the compressor (10) has a substantially constant and low concentration of fuel.

31 Claims, 2 Drawing Sheets

U.S. PATENT DOCUMENTS

| | | | |
|---|---|---|---|
| 5,161,366 A | 11/1992 | Beebe | 60/39.06 |
| 5,407,647 A * | 4/1995 | Tarancon | 422/171 |
| 5,622,041 A * | 4/1997 | Feeley et al. | 60/772 |
| 6,109,018 A * | 8/2000 | Rostrup-Nielsen et al. | 60/777 |
| 6,125,625 A * | 10/2000 | Lipinski et al. | 60/723 |
| 6,298,652 B1 * | 10/2001 | Mittricker et al. | 60/780 |
| 6,393,821 B1 | 5/2002 | Prabhu | 60/39.2 |
| 6,595,001 B2 * | 7/2003 | Rautenbach et al. | 60/772 |
| 6,598,400 B2 | 7/2003 | Nash et al. | 60/772 |

FOREIGN PATENT DOCUMENTS

| | | |
|---|---|---|
| JP | 7190373 A | 7/1995 |
| WO | 01/42400 A1 | 6/2001 |
| WO | 01/42636 A1 | 6/2001 |

* cited by examiner

SYSTEM FOR CATALYTIC COMBUSTION

FIELD OF INVENTION

This invention relates to catalytic combustion.

BACKGROUND OF THE INVENTION

A catalytic combustion gas turbine system has been developed to replace conventional industrial gas turbines, burning natural gas, but with ultra low NOx emissions. One of the features of this turbine is that cooling is required at the inlet of the turbine because of the high inlet temperature (>850° C.), arising from combustion of high concentrations of methane. This cooling is achieved by bypassing a substantial amount of the air from the compressor discharge to the turbine inlet and turbine first stage. However, if the air contains methane, this results in a large amount of uncombusted methane passing through the turbine and into the atmosphere. Not only is this an inefficient use of the methane, but it is also damaging to the environment and a waste of energy.

Another application of catalytic combustion turbine systems has been to generate electricity from waste gases, which have a lower concentration of methane than natural gas. However, previous attempts of this have run into several difficulties; having to inject support fuel (eg. natural gas) into the catalytic combustor to maintain efficient combustion, not being able to efficiently handle gas streams with less than 2 mole % methane, having to excessively raise the pressure of the gas stream thereby reducing the overall electrical output of the system, and having difficulty in controlling the gas temperature at the outlet of the combustor at a constant value below 800° C. so that cooling at the inlet of the turbine is not required, and having problems in handling the waste gas, which by its nature has a fluctuating composition.

SUMMARY OF THE INVENTION

Accordingly, it is desirable, if in one embodiment of the present invention, that there is provided a catalytic combustion gas turbine system which utilises a gas with a substantially constant and low concentration of fuel.

According to a first aspect of the present invention there is provided a system for providing fuel to drive a catalytic combustion gas turbine system the system for providing fuel comprising a mixer, having an outlet stream and at least two inlet streams and a compressor, having an inlet stream, the outlet stream of the mixer being connected to the inlet stream of the compressor, wherein, during operation of the system, the at least two inlet streams are controlled so that the outlet stream of the mixer has a substantially constant composition over time.

Preferably, the outlet stream of the mixer has a low concentration of hydrocarbons.

Preferably, the outlet stream of the mixer is substantially a gas.

Preferably, the outlet stream of the mixer has a low concentration of methane.

Preferably, the outlet stream has a concentration of methane of 0.5 to 1.5 mole %.

Preferably, the outlet stream has a concentration of methane of approximately 1 mole %.

Preferably, of the at least two inlet streams of the mixer, at least one inlet stream has a very low concentration of methane and at least one other inlet stream has a high concentration of methane.

Preferably, of the at least two inlet streams of the mixer, at least one inlet stream has a concentration of methane of 0 to 1.5 mole %, and at least one other inlet stream has a concentration of methane of over 20 mole %.

Preferably, the operating temperature of the mixer is approximately 20° C.

Preferably, the operating pressure of the mixer is approximately atmospheric.

Preferably, the compressor has a compression ratio of approximately 2.

Preferably, the compressor has an outlet stream which has a pressure of less than 3.5 bar (absolute).

Preferably, the pressure of the outlet stream of the compressor is approximately 2 bar (absolute).

Preferably, the temperature of the outlet stream with the compressor is 100 to 200° C.

Preferably, the compressor is an axial flow compressor.

Alternatively, the compressor is a radial flow compressor.

Preferably, at least one of the at least two inlet streams of the mixer is a stream of ventilation air from a coal mine, having very low methane concentration.

Preferably, the system further comprises a first scrubber, the first scrubber having an inlet stream and a gas outlet stream, the gas outlet stream being connected to at least one of the at least two inlet streams of the mixer, and the inlet stream being the stream of ventilation air, wherein, the first scrubber removes particles from the ventilation air through a solid outlet stream.

Preferably, the first scrubber comprises a wet scrubber and filter.

Preferably, the first scrubber removes particles greater than and equal to 0.50 micron in diameter.

Preferably, the scrubber also removes sulphur compounds through a sulphur outlet stream.

Preferably, the first scrubber removes sulphur compounds, so that the concentration of hydrogen sulphide 1and sulphur dioxide in the gas outlet stream is no greater than 10 ppm and 5 ppm respectively.

Preferably, at least one other stream of the at least two inlet streams of the mixer is a stream of coal mine drainage gas.

Preferably, the system further comprises a second scrubber, the second scrubber having an inlet stream and a gas outlet stream, the gas outlet stream being connected to at least one other of the at least two inlet streams of the mixer, and the inlet stream being the stream of coal mine drainage gas, wherein, the second scrubber removes particles from the drainage gas through a solid outlet stream.

Preferably, the second scrubber comprises a wet scrubber and filter.

Preferably, the second scrubber removes particles greater than and equal to 0.50 micron in diameter.

Preferably, the scrubber also removes sulphur compounds through a sulphur outlet stream.

Preferably, the second scrubber removes sulphur compounds, so that the concentration of hydrogen sulphide and sulphur dioxide in the gas outlet stream is no greater than 10 ppm and 5 ppm respectively.

Preferably, the system further comprises a reservoir, the reservoir having an outlet stream connected to the inlet stream of the compressor, and during operation of the system, the outlet stream of the reservoir has a substantially constant composition over time, wherein, the reservoir stores enough fluid to buffer fluctuations in the composition of at least one inlet stream of the reservoir.

Preferably, the reservoir stores a gas.

Preferably, the outlet stream of the mixer is connected to the at least one inlet stream of the reservoir, wherein the mixer and the reservoir are separate units.

Alternatively, the mixer is large enough to act as the reservoir.

Preferably, the operating temperature of the reservoir is approximately 20° C.

Preferably, the operating pressure of the reservoir is approximately atmospheric.

According to a second aspect of the present invention there is provided a system comprising:

a compressor having an inlet stream and an outlet stream, a pre-heater having a process inlet stream and a process outlet stream, a catalytic combustor having an inlet stream and an outlet stream and containing a catalyst, and a turbine having an inlet stream and an outlet stream, wherein, the outlet stream of the compressor is connected to the process inlet stream of the pre-heater, the process outlet stream of the pre-heater is connected to the inlet stream of the catalytic combustor, and the outlet stream of the catalytic combustor is connected to the inlet stream of the turbine, and wherein, during operation of the system, the inlet stream of the compressor has a substantially constant and low concentration of fuel.

Preferably, the inlet stream of the compressor has a low concentration of hydrocarbons.

Preferably, the inlet stream with the compressor is substantially a gas.

Preferably, the inlet stream of the compressor has a low concentration of methane.

Preferably, the inlet stream of the compressor has a methane concentration of 0.5 to 1.5 mole %.

Preferably, the inlet stream of the compressor has a methane concentration of approximately 1 mole %.

Preferably, the inlet stream of the compressor has a temperature of approximately 20° C.

Preferably, the inlet stream of the compressor has a pressure of approximately atmospheric.

Preferably, the system further comprises a mixer, having an outlet stream connected to the inlet stream of compressor, wherein, during operation of the system at least two inlet streams to the mixer are controlled so that the outlet stream has the substantially constant and low concentration of fuel.

Preferably, of the at least two inlet streams of the mixer, at least one inlet stream has a very low concentration of methane and at least one other inlet stream has a high concentration of methane.

Preferably, of the at least two inlet streams of the mixer, at least one inlet stream has a concentration of methane of 0 to 1.5 mole % and at least one other inlet stream has a concentration of methane of over 20 mole %.

Preferably, the compressor has a compression ratio of approximately 2.

Preferably, the outlet stream of the compressor has a pressure of less than 3.5 bar (absolute).

Preferably, the pressure of the outlet stream of the compressor is approximately 2 bar (absolute).

Preferably, the temperature of the outlet stream of the compressor is 100 to 200° C.

Preferably, the compressor is an axial flow compressor.

Alternatively, the compressor is a radial flow compressor.

Preferably, at least one of the at least two inlet streams of the mixer is a stream of ventilation air from a coal mine.

Preferably, the system further comprises a first scrubber, the first scrubber having an inlet stream and a gas outlet stream, the gas outlet stream being connected to at least one of the at least two inlet streams of the mixer, and the inlet stream being the stream of ventilation air, wherein, the first scrubber removes particles greater than and equal to 0.50 micron in diameter from the ventilation air through a solid outlet stream, and the first scrubber also removes sulphur compounds from the ventilation air through a sulphur outlet stream, so that the concentration of hydrogen sulphide and sulphur dioxide in the gas outlet stream is no greater than 10 ppm and 5 ppm respectively.

Alternatively, the first scrubber could be connected between the mixer and the compressor.

Preferably, at least one other stream of the at least two inlet streams of the mixer is a stream of coal mine drainage gas.

Preferably, the system further comprises a second scrubber, the second scrubber having an inlet stream and a gas outlet stream, the gas outlet stream being connected to at least one of the at least two inlet streams of the mixer, and the inlet stream being the stream of coal mine drainage gas, wherein the second scrubber removes particles greater than and equal to 0.50 micron from the ventilation air through a solid outlet stream and also removes sulphur compounds from the ventilation air through a sulphur outlet stream so that the concentration of hydrogen sulphide and sulphur dioxide in the gas outlet stream is no greater than 10 ppm and 5 ppm respectively.

Preferably, the system further comprises a reservoir, the reservoir having an outlet stream connected to the inlet stream of the compressor, and during operation of the system, the outlet stream of the reservoir has a substantially constant composition over time, wherein, the reservoir stores enough fluid to buffer fluctuations in the composition of at least one inlet stream to the reservoir.

Preferably, the reservoir stores the gas.

Preferably, the outlet stream of the mixer is connected to the at least one inlet stream of the reservoir, wherein the mixer and the reservoir are separate units.

Alternatively, the mixer is large enough to act as a reservoir.

Preferably, the operating temperature of the reservoir is approximately 20° C.

Preferably, the operating pressure of the reservoir is approximately atmospheric.

Preferably, the process outlet stream of the pre-heater has a temperature of 475 to 535° C.

Preferably, there is a very low pressure drop across the pre-heater, such that the pressure of the process outlet stream is substantially the same as the pressure of the process inlet stream.

Preferably, the catalytic combustor has a moderate space velocity and a low pressure drop.

Preferably, the catalytic combustor contains a catalyst having a high activity and a high reaction surface area.

Preferably, the activity of the catalyst is $50\sim200\times10^{-7}$ mole/$(m^2 s)$.

Preferably, the reaction surface area of the catalyst is $20\sim40\ m^2/cm^3 m$.

Throughout the specification, the term "activity" is understood to refer to the methane oxidation rate.

Preferably, the catalytic combustor is a honeycomb-type monolith reactor.

Preferably, the catalyst used in the catalytic combustor is a noble metal catalyst.

Preferably, the catalyst used in the catalytic combustor is at least one of either palladium, platinum or rhodium.

Preferably, the monolith is a ceramic, which acts as a substrate for a wash coat slurry of base metals on which the noble metal catalyst is placed.

Preferably, the catalytic combustor has a maximum continuous bed service temperature of 950° C.

Preferably, the outlet stream for the catalytic combustor has a temperature of no more than 800° C.

Preferably, the catalytic combustor has a combustion efficiency of greater than 99%.

Preferably, there is a very low pressure drop across the catalytic combustor, such that the pressure of the outlet stream is substantially the same as the pressure of the inlet stream.

Preferably, the inlet stream of the turbine has a temperature of less than 800° C.

Preferably, the inlet stream of the turbine has a temperature of approximately 780° C.

Preferably, the outlet stream of the turbine has a temperature of approximately 630° C.

Preferably, the outlet stream of the turbine has a pressure slightly above atmospheric.

Preferably, the turbine does not require cooling air from the outlet stream of the compressor to cool the inlet scroll and the first stage of the turbine.

Preferably, the turbine has cooling oil for cooling the shaft and the bearings.

Preferably, the turbine is an axial flow turbine.

Alternatively, the turbine is a radial flow turbine.

Preferably, the turbine is used to drive the compressor.

Preferably, the system further comprises a generator, which is connected to the turbine, wherein the generator converts the shaft work produced by the turbine into electrical energy.

Alternatively, the turbine comprises two turbines based on a split-shaft cycle such that the first turbine drives the compressor, and the second turbine is connected to the generator.

Preferably, the system further comprises a recuperator to recover some of the energy in the outlet stream of the turbine.

Preferably, the recuperator and the pre-heater form a single integral unit, wherein, the pre-heater has a heating inlet stream and a heating outlet stream, the heating inlet stream being connected to the outlet stream of the turbine, such that the outlet stream of the turbine is used to heat the outlet stream of the compressor.

Preferably, the pre-heater is a plate heat exchanger.

Alternatively, the pre-heater is a fin-tube heat exchanger.

Alternatively the pre-heater and the recuperator are separate units such that the outlet stream of the compressor is heated in the pre-heater by heating means other than using the outlet stream of the turbine.

Preferably, the system further comprises a heat recovery boiler, the boiler having an inlet stream connected to the heating outlet stream of the pre-heater, wherein the boiler is adapted, in use, to recover energy from the turbine outlet stream.

Preferably, the system further comprises a pre-burner, having an inlet stream, an outlet stream and a start-up fuel stream, the inlet stream being connected to the process outlet stream of the pre-heater, and the outlet stream being connected to the inlet stream of the catalytic combustor, wherein the pre-burner is used to combust the start-up fuel stream during start-up of the turbine and during low load operation.

Preferably, the start-up fuel is a hydrocarbon.

Preferably, the start-up fuel is liquid petroleum gas.

Preferably, during normal operation of the system, the start-up fuel stream has a flow rate of 0, and the process outlet stream of the pre-heater passes through the pre-burner unreacted.

According to a third aspect of the present invention there is provided a method of producing a gas with a substantially constant and low concentration of fuel, the method comprising the steps of specifying a desired concentration of fuel in the outlet stream of a mixer, mixing at least one stream with a very low concentration of fuel with at least one stream with a high concentration of fuel in the mixer and controlling the flow rate of the at least one stream with a high concentration of fuel to meet the desired concentration of fuel in the outlet stream of the mixer.

Preferably, the fuel is a hydrocarbon fuel.

Preferably, the fuel is methane.

Preferably, the desired concentration of methane is 0.5 to 1.5 mole %.

Preferably, the desired concentration of methane is approximately 1 mole %.

Preferably, the at least one stream with a very low concentration of fuel, has a concentration methane of 0 to 1.5 mole %.

Preferably, the at least one stream with a high concentration of fuel has a concentration methane of over 20 mole %.

Preferably, the at least one stream with a very low concentration of fuel is a stream of ventilation air from a coal mine.

Preferably, the at least one stream with a high concentration of fuel is a stream of coal mine drainage gas.

Preferably, the method further comprises the step of scrubbing the ventilation air to remove particles using a first scrubber.

Preferably, the method further comprises the step of scrubbing the ventilation air to remove particles greater than and equal to 0.50 micron in diameter using the first scrubber.

Preferably, the method further comprises the step of scrubbing the ventilation air to remove sulphur compounds using the first scrubber.

Preferably, the method further comprises the step of scrubbing the ventilation air to remove sulphur compounds using the first scrubber so that the first scrubber has a gas outlet stream which has a concentration of hydrogen sulphide and sulphur dioxide of no greater than 10 ppm and 5 ppm respectively.

Preferably, the method further comprises the step of scrubbing the coal mine drainage gas to remove particles using a second scrubber.

Preferably, the method further comprises the step of scrubbing the coal mine drainage gas to remove particles greater than and equal to 0.50 micron in diameter, using the first scrubber.

Preferably, the method further comprises the step of scrubbing the coal mine drainage gas to remove sulphur compounds using the second scrubber.

Preferably, the method further comprises the step of scrubbing the coal mine drainage gas to remove sulphur compounds using the second scrubber so that the second scrubber has a gas outlet stream which has a concentration of hydrogen sulphide and sulphur dioxide of no greater than 10 ppm and 5 ppm respectively.

Preferably, the method further comprises the step of storing the gas in a reservoir.

Preferably, the mixer is large enough to act as the reservoir.

Alternatively, the outlet stream of the mixer is connected to an inlet stream of the reservoir, wherein the mixer and the reservoir are separate units.

According to a fourth aspect of the present invention there is provided a method of producing electricity, the method comprising the steps of, mixing at least two gas streams to produce a process gas stream with a substantially constant and low fuel concentration prior to, compressing the process gas stream, preheating the process gas stream, combusting the process gas stream in the presence of a catalyst, expanding the process gas stream in a turbine to produce shaft work, converting the turbine shaft work to electricity using a generator.

Preferably, the step of mixing at least two gas streams, comprises the method of producing a gas with a low concentration of fuel in accordance with the third aspect of the present invention.

Preferably, the process gas stream is compressed to 1.5 to 3.5 bar (absolute).

Preferably, the process gas stream is compressed to approximately 2 bar (absolute).

Preferably, the process gas stream is preheated to 475 to 535° C.

Preferably, the catalyst is a noble metal catalyst.

Preferably, the catalyst is at least one of either palladium, platinum or rhodium.

Preferably, the catalyst is placed on a ceramic monolith, which acts as a substrate for wash coat slurry of base metals.

Preferably, a stream includes a fluid in a conduit.

The words "comprising, having including" should be interpreted in an inclusive sense, meaning that additional features may also be added.

Variations and modifications can be made in respect of the invention described above and defined in the following statement of claim.

BRIEF DESCRIPTION OF THE DRAWINGS

Preferred embodiments of the invention will now be described, by way of example only, with reference to the accompanying drawings in which.

DETAILED DESCRIPTION OF PREFERRED EMBODIMENTS

Figure 1:
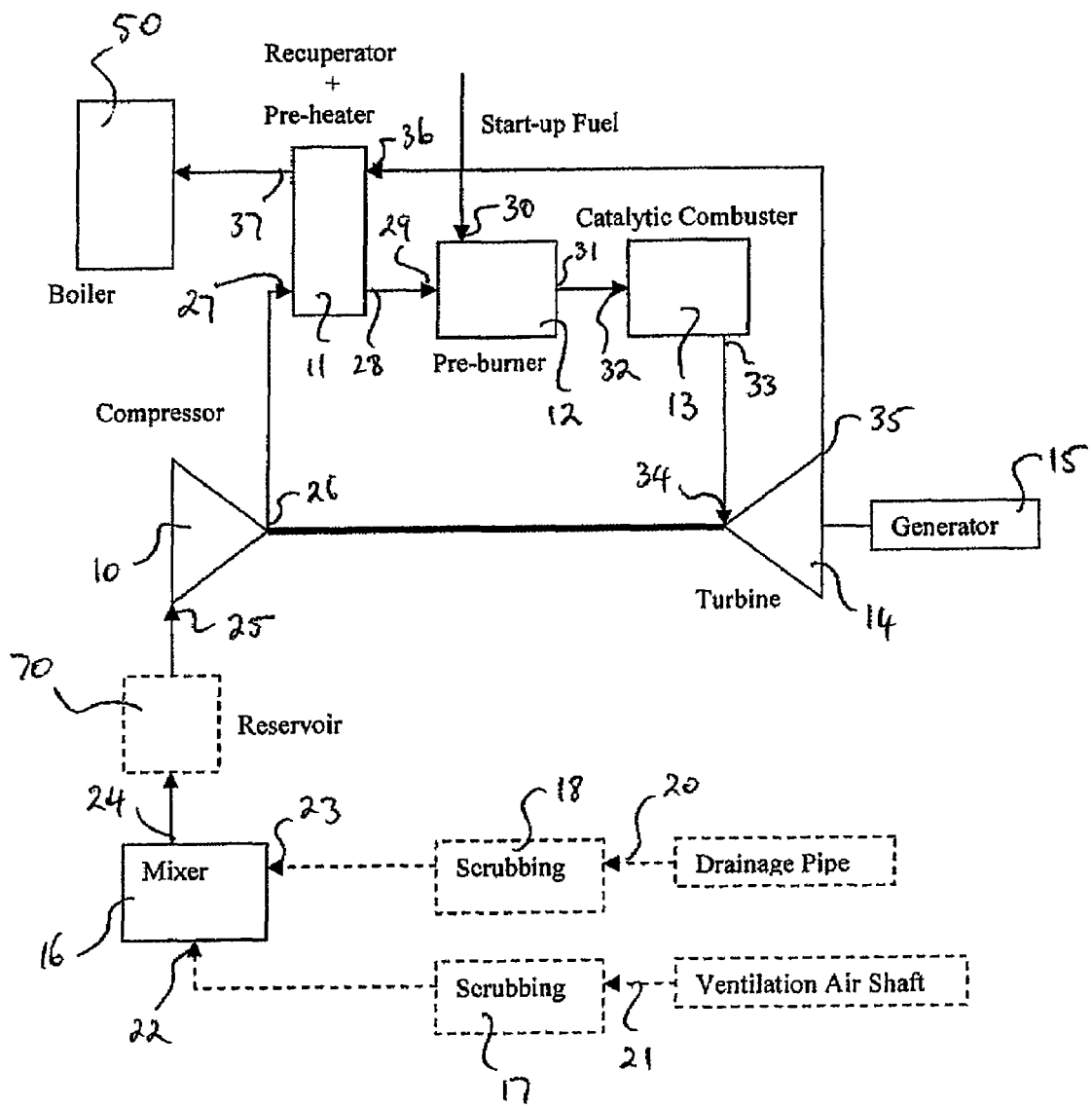
FIG. 1 is a block diagram of a catalytic combustion gas turbine system.

With reference to FIG. 1, a preferred embodiment of a catalytic combustion gas turbine system comprises a compressor 10, a recuperator 11, a pre-burner 12, a catalytic combustor 13, a turbine 14, a generator 15, a mixer 16, and first and second scrubbers 17, 18 thereby forming a power generation system which can be powered with approximately 1 mole % methane (maximum 1.5 mole %, minimum 0.5 mole %).

The system is predominantly powered by the methane in the ventilation air from a coal mine 21. The ventilation air is scrubbed in the first scrubber 17, to remove dust particles greater than and equal to 0.50 micron in diameter. The first scrubber 17 also removes hydrogen sulphide and sulphur dioxide so that the concentration of these compounds does not exceed the maximum allowable concentration in the system, which is 10 ppm for hydrogen sulphide and 5 ppm for sulphur dioxide. Exceedance of the maximum allowable concentrations can lead to fouling of the system components and deactivation of the catalyst in the catalytic combustor.

Having been scrubbed in the first scrubber 17, the ventilation air then enters the mixer 16 through a first inlet 22. Because the concentration of methane in the ventilation air 21 can vary between 0 and 1.5 mole %, it is necessary to mix it with another gas so as to provide a gas with nearly constant methane concentration over time to the compressor 10. This is achieved using coal mine drainage gas 20, which is also subjected to a similar scrubbing operation in the second scrubber 18. The second scrubber 18, removes dust particles and hydrogen sulphide and sulphur dioxide to the same levels as the first scrubber 17, before the drainage gas 20 enters the mixer 16 through a second inlet 23. The drainage gas has a methane concentration of over 20 mole %.

The mixer 16 operates at approximately 20° C. and atmospheric pressure. The amount of drainage gas 20 that is mixed with the ventilation air 21 is controlled so that at the mixer's outlet 24, the concentration of methane in the gas is generally constant over time.

The system further comprises a reservoir 70 which is connected to the outlet of the mixer 24. The reservoir 70 stores a large amount of the mixed gas at approximately 20° C. and atmospheric pressure. The purpose of the reservoir 70 is to buffer the downstream components of the system from possible fluctuations in the concentration of methane in the gas from the outlet 24 of the mixer 16.

The gas flows from the outlet of the reservoir to the inlet 25 of the compressor 10. The compressor 10 has a compressor ratio of approximately 2. This means that the pressure of the gas at the outlet 26 of the compressor 10, will be approximately 2 bar. For efficient operation of the system, the pressure at the outlet 26 of the compressor 10 should be no greater than 3.5 bar. The compressor 10 can be either an axial flow compressor or a radial flow compressor. The temperature of the gas at the outlet 26 of the compressor 10 will be 100 to 200° C.

From the outlet 26 of the compressor 10, the gas flows to the primary inlet 27 of the recuperator 11. The recuperator heats the gas so that at the primary outlet 28 of the recuperator 11, the temperature of the gas is between 475 and 535° C. The recuperator 11 operates with a very low pressure drop across the primary inlet 27 and the primary outlet 28, so that the pressure of the primary outlet 28 is very similar to the pressure of the primary inlet 27. Whilst any heating means can be used to heat the gas in the recuperator 11, for efficient energy usage, the present invention utilises the gas exiting the turbine 14 through outlet 35. This gas enters the recuperator 11 through a secondary inlet 36, where it transfers energy to the gas entering through the primary inlet 27, before exiting the recuperator 11 through the secondary outlet 37. This transfer of energy is achieved without any direct physical contact between the two gases, using either a plate heat exchanger or a fin-tube heat exchanger.

Figure 2:
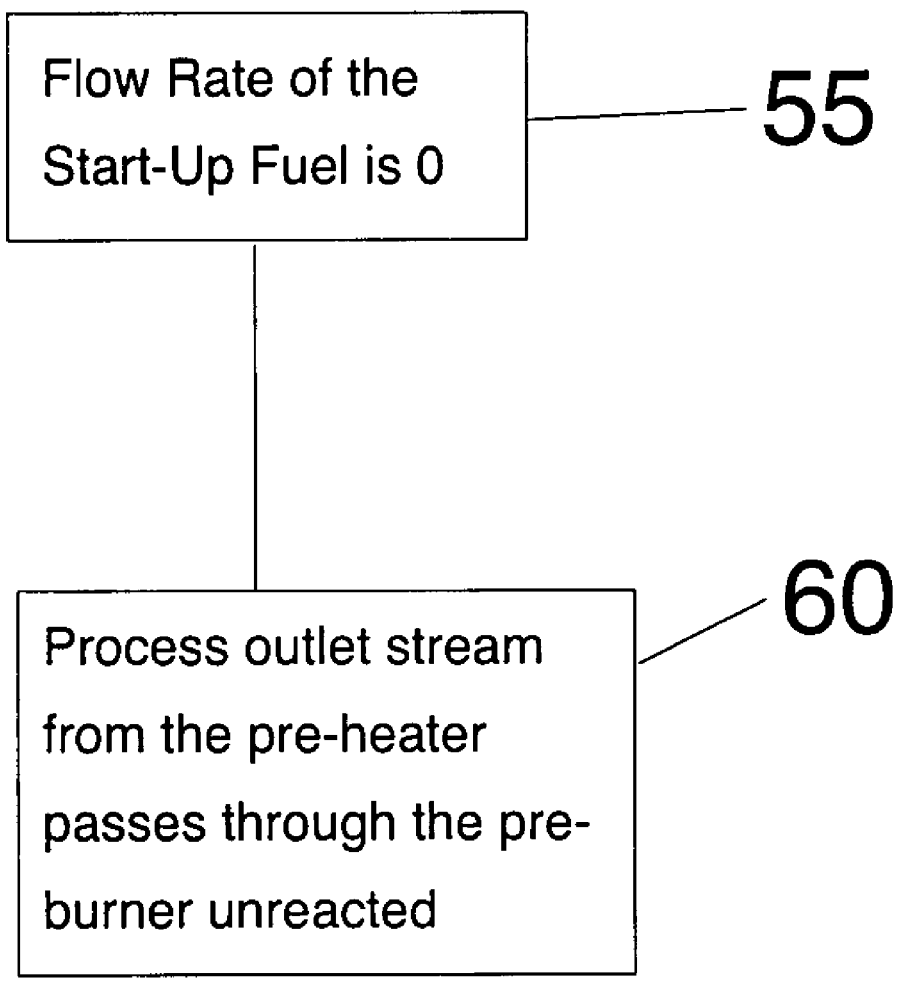
FIG. 2 is an exemplary flow chart of the catalytic combustion gas turbine system according to the present disclosure.

The gas exiting the recuperator 11 through primary outlet 28, then flows into the pre-burner 12 through an inlet 29. During normal continuous operation of the system, the gas flows through the pre-burner 12 without any change in its composition, temperature, pressure or other properties, such that the gas exits the pre-burner 12 through outlet 31 unchanged from the gas that entered through inlet 29. The pre-burner 12 is only operated during the start-up of the system and during low load operation. During these instances, start-up fuel such as LPG is injected into the pre-burner through the start-up fuel inlet 30. The pre-burner 12 is then operated to facilitate partial combustion of both the start-up fuel and the gas entering through inlet 29, before complete combustion occurs in the catalytic combustor 13. In one exemplary embodiment, flow rate of the start-up fuel in the inlet 30 is 0, as shown in step 55 of FIG. 2, and process outlet stream from the pre-heater passes through the pre-burner 12 unreacted, as shown in step 60 of FIG. 2, during normal continuous operation of the system.

The gas exiting the pre-burner 12 through outlet 31 flows into the catalytic combustor 13 through an inlet 32. The catalytic combustor 13 is a honeycomb-type monolith reactor. Monoliths have a large open frontal area resulting in a low pressure drop, which is necessary for the required moderate space velocities of the system. Nobel metal catalysts are used in the catalytic combustor 13. The ceramic monolith acts as a substrate for a wash coat slurry of base metals, such as alumina and ceria, on which the nobel metal catalyst such as palladium, platinum or rhodium are placed. The maximum continuous bed service temperature can be 950° C., but for short periods can reach up to 1050° C. The catalytic combustor 13 has a combustion efficiency of over 99%. The gas exiting the combustor 13 through outlet 33 has a temperature of equal to or less than 800° C. and a pressure which is similar to that of the gas entering the catalytic combustor through inlet 32. The similar pressure of the gas at the outlet 33 to the inlet 32 is a result of the low pressure drop across the catalytic combustor 13.

The gas from the outlet 33 of the catalytic combustor 13 enters the turbine 14 through an inlet 34. The temperature of the gas at the inlet 34 should be no greater than 800° C., and is generally controlled to be approximately 780° C. If the temperature of the gas becomes elevated above 800° C., then cooling of the inlet scroll and the first stage of the turbine using gas from outlet 26 of the compressor 10 would be required. However, it is a feature of the preferred embodiments of the present invention that such cooling is not required. Cooling oil is supplied to cool the shaft and bearings.

The gas is expanded in the turbine 14 to produce shaft work, resulting in the gas exiting the turbine 14 through outlet 35 having a temperature of approximately 630° C. and a pressure of slightly above atmospheric. Some of the shaft work of the turbine 14 is used to drive the compressor 10 through the connection 39. The remaining shaft work is converted into electrical energy by the generator 15 which is connected by 38 to the turbine 14. Alternatively, the turbine 14 may comprise two turbines which operate on a split shaft cycle. The first turbine is used to drive the compressor 10 and the second turbine is connected to the generator 15. The turbine(s) 14 can be either an axial flow turbine(s) or a radial flow turbine(s).

The system also includes a heat recovery boiler 50. The gas exiting the secondary outlet 37 of the recuperator 11 enters the heat recovery boiler 50, where it is processed to recover as much of the remaining energy in the gas as possible.

The claims defining the invention are as follows:

1. A method for catalytic combustion of a low concentration fuel comprising:
   compressing a substantially constant low concentration inlet fuel at a compression ratio of no greater than 3.5 to form a compressed fuel;
   pre-heating the compressed fuel to form a pre-heated compressed fuel;
   combusting the pre-heated compressed fuel in the presence of a catalyst at a combustion temperature of no greater than 800° C. to form a gas stream; and
   expanding the gas stream in a turbine, at least part of said gas stream being recirculated, after expansion, for pre-heating of said compressed fuel.

2. A method as claimed in claim 1, wherein said inlet fuel is compressed at a compression ratio of 1.5 to 3.5.

3. A method as claimed in claim 1, wherein said inlet fuel is compressed at a compression ratio of approximately 2.

4. A method as claimed in claim 1, wherein said compressed fuel has a temperature of 100 to 200° C. prior to pre-heating.

5. A method as claimed in claim 4, wherein the compressed fuel is pre-heated to a temperature of 475 to 535° C.

6. A method as claimed in claim 1, wherein said gas stream resulting from combustion of said pre-heated compressed fuel has a temperature of approximately 780° C. and said at least part of said gas stream being recirculated, after expansion, for pre-heating of said compressed fuel has a temperature of approximately 630° C.

7. A method as claimed in claim 1, wherein said inlet fuel comprises a gas with a methane concentration of 0.5 to 1.5 mole %.

8. A method as claimed in claim 7, wherein said inlet fuel comprises a mixture of a first gas and a second gas, said method further comprising mixing said first gas and said second gas to form said substantially constant low concentration inlet fuel.

9. A method as claimed in claim 8, wherein said first gas has a methane concentration of 0 to 1.5 mole % and said second gas has a methane concentration of over 20 mole %.

10. A method as claimed in claim 8, wherein said first gas is ventilation air from an underground coal mine and said second gas is drainage gas from an underground coal mine.

11. A method as claimed in claim 10, further comprising scrubbing said ventilation air and said drainage gas prior to mixing.

12. A method as claimed in claim 11, wherein said scrubbing removes particles of greater than and equal to 0.5 micron in diameter from said ventilation air and said drainage gas.

13. A method as claimed in claim 12, wherein said scrubbing removes sulfur compounds from said ventilation air and said drainage gas respectively, such that the concentration of hydrogen sulfide in said first gas and said second gas after scrubbing is no greater than 10 ppm and that the concentration of sulfur dioxide in said first gas and second gas after scrubbing is no greater than 5 ppm.

14. A method as claimed in claim 1, wherein said inlet fuel comprises a gas with a methane concentration of approximately 1 mole %.

15. A method as claimed in claim 1, further comprising converting turbine shaft work resulting from expansion of said gas stream in said turbine to electricity using a generator.

16. A method as claimed in claim 15, wherein at least a portion of said electricity generated is used to power a compressor used for compression of said inlet fuel.

17. A catalytic combustion system comprising:
   a source of a substantially constant low concentration inlet fuel;
   a compressor for compressing the substantially constant low concentration inlet fuel;
   a pre-heater in fluid communication with said compressor, said pre-heater receiving compressed fuel from said compressor;
   a catalytic combustor in fluid communication with said pre-heater, said catalytic combustor receiving pre-heated compressed fuel from said pre-heater and combusting same in the presence of a catalyst; and
   a turbine in fluid communication with said catalytic combustor and said pre-heater, said turbine receiving a gas stream resulting from combustion of the pre-heated compressed fuel, at least part of said gas stream being recirculated from said turbine to said pre-heater;
   wherein said compressor operates at a compression ratio of no greater than 3.5 and wherein said gas stream received by said turbine has a temperature of less than 800° C.

18. A system as claimed in claim 17, wherein said compressor operates at a compression ratio of 1.5 to 3.5.

19. A system as claimed in claim 17, wherein said compressor operates at a compression ratio of approximately 2.

20. A system as claimed in claim 17, wherein said inlet fuel comprises a mixture of a first gas and a second gas, said system further comprising a mixer for mixing said first gas and said second gas.

21. A system as claimed in claim 20, further comprising a reservoir disposed between said mixer and said compressor, said reservoir containing a mixture of said first and second gases and acting as a buffer to possible fluctuations in fuel concentration of said first and second gases, thereby ensuring the supply of said substantially constant, low concentration inlet fuel to said compressor.

22. A system as claimed in claim 20, wherein said first gas is ventilation air from an underground coal mine and said second gas is drainage gas from an underground coal mine.

23. A system as claimed in claim 22, further comprising a first scrubber for scrubbing said ventilation air and a second scrubber for scrubbing said drainage gas.

24. A system as claimed in claim 23, wherein said first and second scrubbers remove particles of greater than and equal to 0.5 micron in diameter from said ventilation air and said drainage gas, and wherein said first and second scrubbers remove sulfur compounds from said ventilation air and said drainage gas respectively, such that the concentration of hydrogen sulfide in gas outlet streams of the first and second scrubbers is no greater than 10 ppm and that the concentration of sulfur dioxide in gas outlet streams of the first and second scrubbers is no greater than 5 ppm.

25. A system as claimed in claim 17, wherein said catalytic combustor contains a catalyst having an activity of $50 \times 10^{-7}$ to $200 \times 10^{-7}$ mole/m$^2$s and a reaction surface area of 20 to 40 m$^2$/cm$^2$.

26. A system as claimed in claim 25, wherein said catalytic combustor is a honeycomb-type monolith catalytic combustor.

27. A system as claimed in claim 26, wherein said honeycomb-type monolith catalytic combustor comprises a ceramic monolith which acts as a substrate for a wash coat slurry of base metals on which a noble metal catalyst is placed.

28. A system as claimed in claim 17, further comprising a pre-burner in fluid communication with said pre-heater and said catalytic combustor, said pre-burner having a start up fuel inlet that, during start up of said system, supplies a start up fuel to said pre-burner which is combusted to heat compressed fuel received from said compressor, via said pre-heater, to provide heated compressed fuel to the catalytic combustor during start up of the system.

29. A system as claimed in claim 17, wherein said compressed fuel has a temperature of 100 to 200° C. prior to pre-heating, and wherein the compressed fuel is pre-heated to a temperature of 475 to 535° C.

30. A system as claimed in claim 17, wherein said gas stream resulting from combustion of said pre-heated compressed fuel has a temperature of approximately 780° C. and said at least part of said gas stream being recirculated, after expansion, for pre-heating of said compressed fuel has a temperature of approximately 630° C.

31. A catalytic combustion system for combustion of ventilation air and drainage gas from an underground coal mine, said system comprising:
  a first scrubber for scrubbing ventilation air received from the underground coal mine and a second scrubber for scrubbing drainage gas received from the underground coal mine;
  a mixer located down stream of said first scrubber and said second scrubber for mixing said drainage gas with said ventilation air;
  a controller for controlling the amount of drainage gas mixed with said ventilation air such that a fuel mixture comprising a substantially constant concentration of 0.5 to 1.5 mole % methane is emitted from the mixer;
  a reservoir located down stream of said mixer, said reservoir containing the fuel mixture emitted from the mixer and acting as a buffer to possible fluctuations in fuel concentration of said ventilation air and said drainage gas, thereby ensuring the supply of a substantially constant low concentration fuel;
  a compressor for compressing said substantially constant low concentration fuel, said compressor operating at a compression ratio of no greater than 3.5;
  a pre-heater in fluid communication with said compressor, said pre-heater receiving compressed fuel from said compressor;
  a catalytic combustor in fluid communication with said pre-heater, said catalytic combustor receiving pre-heated compressed fuel from said pre-heater and combusting same in the presence of a catalyst; and
  a turbine in fluid communication with said catalytic combustor and said pre-heater, said turbine receiving a gas stream having a temperature of less than 800° C. resulting from combustion of the pre-heated compressed fuel, at least part of said gas stream being recirculated from said turbine to said pre-heater.

* * * * *